United States Patent [19]

McCarty et al.

[11] 4,214,038

[45] Jul. 22, 1980

[54] FABRIC TREATMENT COMPOSITIONS CONTAINING POLYGLYCEROL ESTERS

[75] Inventors: Charles B. McCarty; Paul Seiden, both of Cincinnati, Ohio

[73] Assignee: The Procter & Gamble Company, Cincinnati, Ohio

[21] Appl. No.: 5,114

[22] Filed: Jan. 22, 1979

Related U.S. Application Data

[63] Continuation of Ser. No. 851,249, Nov. 14, 1977, abandoned, which is a continuation of Ser. No. 647,969, Jan. 9, 1976, abandoned.

[51] Int. Cl.[2] .......................... B32B 9/04; B08B 3/00; F26B 7/00

[52] U.S. Cl. ........................................ 428/411; 8/137; 34/12; 252/8.6; 252/153; 427/237; 427/421; 427/424; 428/219; 428/245

[58] Field of Search .................. 252/8.6, 8.8, 8.9, 153, 252/334; 428/219, 213, 411, 245; 427/237, 421, 240, 424, 11, 242; 8/137; 118/76; 34/12

[56] References Cited

U.S. PATENT DOCUMENTS

| | | | |
|---|---|---|---|
| 2,460,259 | 1/1949 | Kahler | 427/237 |
| 2,564,423 | 8/1951 | Barnum | 252/334 |
| 2,665,443 | 1/1954 | Simon et al. | 15/159 R |
| 2,734,830 | 2/1956 | Hagge et al. | 8/137 |
| 3,442,692 | 5/1969 | Gaiser | 427/240 |
| 3,632,396 | 1/1972 | Perez-Zamora | 252/8.6 X |
| 3,633,538 | 1/1972 | Hoeflin | 118/76 |
| 3,650,816 | 3/1972 | Rudy et al. | 34/12 X |
| 3,676,199 | 7/1972 | Hewitt et al. | 428/213 |
| 3,686,025 | 8/1972 | Morton | 428/219 |
| 3,785,973 | 1/1974 | Bernholz et al. | 252/8.8 |
| 3,896,033 | 7/1975 | Grimm | 252/8.8 |
| 4,022,938 | 5/1977 | Zaki et al. | 427/242 |
| 4,057,673 | 11/1977 | Falivene | 428/411 |
| 4,085,052 | 4/1978 | Murphy et al. | 252/8.6 |

FOREIGN PATENT DOCUMENTS

| | | |
|---|---|---|
| 155140 | 6/1951 | Australia . |
| 1313697 | 4/1973 | United Kingdom . |
| 1383748 | 2/1975 | United Kingdom . |

*Primary Examiner*—Thomas J. Herbert, Jr.
*Attorney, Agent, or Firm*—Ronald L. Hemingway; Richard C. Witte

[57] ABSTRACT

A non-staining, anti-static fabric softening composition comprising particular "polyglycerol esters" is applied to fabrics in an automatic laundry dryer.

13 Claims, No Drawings

FABRIC TREATMENT COMPOSITIONS CONTAINING POLYGLYCEROL ESTERS

This is a continuation of Application Ser. No. 851,249, filed Nov. 14, 1977, now abandoned which is a continuation of Application Ser. No. 647,969, filed Jan. 9, 1976 and now abandoned.

BACKGROUND OF THE INVENTION

The present invention encompasses articles and methods for providing softening and anti-static benefits to fabrics in an automatic laundry dryer. More specifically, damp fabrics are commingled with particular "polyglycerol esters" in an automatic clothes dryer and are provided with a soft, anti-static finish concurrently with the drying operation. The softening and anti-static polyglycerol esters herein are preferably employed in combination with a dispensing means adapted for use in an automatic dryer.

Treatment in an automatic clothes dryer has been shown to be an effective means for imparting desirable tactile properties to fabrics. For example, it is becoming common to soften fabrics in an automatic clothes dryer rather than during the rinse cycle of a laundering operation. (See Gaiser, U.S. Pat. No. 3,442,692, issued May 6, 1969)

Fabric "softness" is an expression well defined in the art and is usually understood to be that quality of the treated fabric whereby its handle or texture is smooth, compliable and fluffy to the touch. Various chemical compounds have long been known to possess the ability to soften fabrics when applied to them during a laundering operation.

Fabric softness also connotes the absence of static "cling" in the fabrics, and the commonly used cationic fabric softeners provide both softening and anti-static benefits when applied to fabrics. Indeed, with fabrics such as nylon and polyester, the user is more able to perceive and appreciate an anti-static benefit than a true softening benefit.

Fatty alkyl cationic anti-static softening compounds and compositions designed for application to fabrics in an automatic dryer have been the subject of recent innovations. (See, for example, Furgal, U.S. Pat. No. 3,634,947, issued Jan. 18, 1972; Morton, U.S. Pat. No. 3,686,025, issued Aug. 22, 1972; and Gaiser, U.S. Pat. No. 3,442,692, issued May 6, 1969.) Other fatty materials have been suggested for use as dryer-added fabric softeners. (See, for example, Hewitt et al, U.S. Pat. No. 3,676,199, issued July 11, 1972 and the co-pending application of Murphy and Habermehl, Ser. No. 417,329, filed Nov. 19, 1973, now U.S. Pat. No. 4,000,340, issued Dec. 28, 1976.) Included among these prior softening compositions are various glycerides in combination with oil-soluble, lower-ethoxylated surfactants. Various polyol ester fabric treating agents are disclosed in Colgate Palmolive British Pat. No. 1,383,748, published Feb. 12, 1975; Grimm, U.S. Pat. No. 3,896,033, issued July 22, 1975; Bernholz et al., U.S. Pat. No. 3,785,973, issued Jan. 15, 1974; copending Application Ser. No. 440,931, Murphy et al., filed Feb. 8, 1974; and Application Ser. No. 417,329, Murphy et al., filed Nov. 19, 1973, now U.S. Pat. No. 4,000,340, issued Dec. 28, 1976.

As pointed out in Hewitt et al, U.S. Pat. No. 3,676,199, issued July 11, 1972 and Wixon, U.S. Pat. No. 3,766,062, issued Oct. 16, 1973, many of the prior art softening agents stain or discolor the conditioned fabrics when used in an automatic dryer. The unfortunate tendency of such materials to stain fabrics is apparently caused by the presence of the fatty alkyl groups in the active softening compounds. Unevenly distributed fatty softeners can appear as blotchy, oily stains on the treated fabrics. Thus, the chemical structure which gives rise to the soft, lubricious feel associated with the prior art softeners also causes them to be potential fabric stainers.

Heretofore, a variety of mechanical methods have been employed in an attempt to reduce the tendency of dryer-added softeners to stain fabrics. The prior art fabric softening agents have been sorbed onto flexible articles designed to provide controlled release at dryer operating temperatures. While such articles are quite attractive from the standpoint of ease of manufacture and economics, staining can still be a problem if an improperly formulated flexible article becomes entangled in clothing. Various rigid dispensers and appliances have been designed which assertedly avoid any exceptionally high concentrations of softening agent being undesirably deposited on the fabrics in the form of greasy stains (See Hoeflin, U.S. Pat. No. 3,633,538, issued Jan. 11, 1972 and Grand et al, U.S. Pat. No. 3,698,095, issued Oct. 17, 1972). However, such dispensers are costly and have not come into general use.

Certain surfactants have been suggested for obviating the tendency of the prior art softeners to stain fabrics. (See the co-pending application of Murphy and Habermehl, Ser. No. 440,932, filed Feb. 8, 1974, now abandoned.) This nonstaining aspect is especially important when the common polyester fabrics, which are oleophilic and particularly susceptible to oily staining, are softened in an automatic dryer.

As noted above, many softening compounds have been adapted for use in automatic dryers by fashioning articles which contain a pre-measured amount of the softener. Preferred articles comprise a flexible sheet substrate coated and/or impregnated with an optimal, pre-measured amount of a fabric softener. These articles are simply added to a dryer together with the fabrics to be dried. The heat and tumbling action of the dryer helps to dispense the softener onto the fabric surfaces (See, for example, Perez-Zamora, U.S. Pat. No. 3,632,396, issued Jan. 4, 1972). However, once sorbed onto the sheet substrate, some softeners tend to remain affixed thereto, rather than being dispensed onto the fabrics. Thus, the user of such articles cannot be assured that the optimal amount of softener originally present in the article is, in fact, deposited on the fabrics. To obviate this problem, it has been suggested to layer the softener onto the sheet together with surfactant-type release agents which insure substantially complete transfer to the fabrics (See Perez-Zamora, U.S. Pat. No. 3,632,396, issued Jan. 4, 1972).

Finally, some cationic materials recognized for use as fabric softeners and anti-static agents in dilute, aqueous rinse baths are not particularly useful in certain automatic dryers in that they are reported to soften and loosen certain paints used to protect the dryer drum, and to corrode exposed metal surfaces of some automatic dryer drums.

It has now been found that certain fatty polyglycerol esters are particularly useful as dryer-added fabric softeners. Such materials contain several free or esterified hydroxyl groups.

Various compounds containing hydroxyl groups are recognized as useful fabric scrooping agents in aqueous media, e.g., those listed in Speel et al, *Textile Chemicals and Auxiliaries,* 2nd Edition, Reinhold Publishing Corp., 1957. Some ethoxylated alcohols are further known to be useful in textile lubricating compositions (See Cohen et al, U.S. Pat. No. 3,773,463, issued Nov. 20, 1973. The use of various fatty sorbitan esters to treat fabrics in a clothes dryer is disclosed in U.S. Pat. No. 4,085,052, issued Apr. 18, 1978, a continuation of Application Ser. No. 543,606, filed Jan. 27, 1975, now abandoned, which was a continuation-in-part of Application Ser. No. 461,311 filed Apr. 16, 1974, now abandoned; and U.S. Pat. No. 4,022,938 issued May 10, 1977, a continuation-in-part of Application Ser. No. 461,312 filed Apr. 16, 1974, now abandoned.

It has now been found that certain fatty polyglycerol esters are especially useful in automatic dryers relative to other prior art fabric softeners. More specifically, these fatty polyglycerol esters help alleviate all the aforesaid problems relating to through-the-dryer fabric softening.

First, the fatty polyglycerol esters impart a soft, lubricious feel to fabrics when applied to such fabrics in a heated clothes dryer.

Second, these esters provide an anti-static effect. Accordingly, it is not necessary to use additives with the fatty polyglycerol esters to achieve the dual benefits of fabric softening and reduced static charge.

Third, these esters can be readily dispensed onto fabrics from dryer-added flexible substrate articles by the heat and tumbling action of the dryer without the need for adjuvant release agents.

Fourth, these esters provide niminal staining of fabrics when used in the manner disclosed herein.

Fifth, these esters are non-toxic, non-irritating substances which have no undesirable effects on the environment.

Finally, the fatty polyglycerol esters are safe for use in contact with dryer drum paint and/or metal dryer drum surfaces and, in fact, function as a corrosion inhibitor in the dryer.

It is an object of this invention to provide a safe, effective means for softening fabrics in a clothes dryer.

It is another object herein to provide a superior article of manufacture adapted for imparting softness and anti-static benefits to fabrics in a clothes dryer.

It is another object herein to provide articles of manufacture and methods for softening fabrics in a laundry dryer by employing materials which do not disadvantageously interact with dryer drum metal or paint.

These and other objects are obtained herein as will be seen from the following disclosure.

SUMMARY OF THE INVENTION

The present invention encompasses an article of manufacture adapted for use in an automatic laundry dryer comprising a fabric softening amount of a fatty alkyl polyglycerol ester component, as defined hereinafter, and a dispensing means which provides for release of an effective amount of said esters at automatic dryer operating temperatures, i.e., 38° C.-100° C.

The invention also encompasses a method for imparting a softening and anti-static effect to fabrics in an automatic dryer comprising commingling pieces of damp fabric by tumbling said fabrics under heat in a clothes dryer with an effective, i.e., softening, amount of the aforementioned fatty polyglycerol ester material.

DETAILED DESCRIPTION OF THE INVENTION

The articles herein are fashioned from fabric softening compositions containing certain "fatty polyglycerol" fabric softeners and from a dryer dispensing means, as more fully described hereinafter.

FABRIC SOFTENER COMPOSITIONS

Fabric softening compositions employed herein comprise, as their essential component, a fatty polyglycerol ester fabric softener. Such compositions can also contain a variety of optional materials.

The fatty polyglycerol ester fabric softeners employed in the present invention can be described by the following general formula:

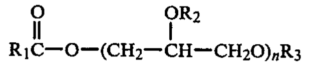

wherein $R_1$ is a $C_9$ to $C_{23}$ (preferably $C_{11}$ to $C_{21}$) aliphatic acyclic hydrocarbyl group, and $R_2$ and $R_3$ are selected from the group consisting of hydrogen and $C_8$ to $C_{24}$ (preferably $C_{12}$ to $C_{22}$) fatty acyl groups and n is from 2 to 20, preferably from 2 to 10 and most preferably from 2 to 4, and wherein the crystal melting point of said fatty polyglycerol ester is greater than about 38° C. In a single polyglycerol ester chain, each of the repeating glycerol groups can contain identical "R" group substituents or they can contain different "R" group substituents. For example, the compounds

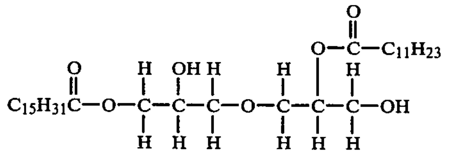

and

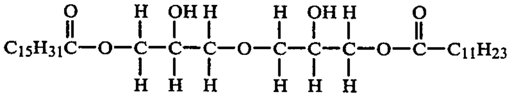

are both included within the scope of the fatty polyglycerol esters of the present invention.

It is generally desirable that the fatty polyglycerol esters used herein have a crystal melting point between about 38° C. and 100° C., however, polyglycerol esters with melting points above 100° C. are still operable in the present invention since even though they will not melt in the dryer, they will become dispersed in the water present on the damp fabrics in the dryer and will thereby be deposited uniformly on the fabrics.

The fatty polyglycerol esters herein can be completely esterified, i.e., all available hydroxyl groups esterified; however, it is preferable that the degree of esterification be such that from about 20% to about 60% of the hydroxyl groups be esterified (i.e., a degree of esterification between about 0.2 and 0.6). This provides the optimum balance between softening and anti-static effects.

The polyglycerol esters are well known compounds, having been used extensively as emulsifiers in food products. They are made by the esterification of polyglycerol with fatty acids. The polyglycerol itself is prepared by the alkali catalyzed thermal dehydration of glycerol (see, for example, U.S. Pat. No. 2,487,208, issued to W. G. Alsop). A process for controlling the glycerine polymerization reaction so as to produce a high proportion of the preferred lower polyglycerols (i.e., n equals from 2 to 4) is described in U.S. Pat. No. 3,968,169, Seiden et al., issued July 6, 1976, and incorporated herein by reference.

In the polymerization of glycerol, minor amounts of cyclic and non-linear acyclic polyglycerols can be formed and these become esterified in any subsequent esterification reaction. Thus, the polyglycerol esters of the present invention, unless highly purified, will contain minor amounts of the cyclic and non-linear acyclic polyglycerol esters.

Specific examples of polyglycerol esters suitable for use in the present invention are hexaglycerol distearate, decaglycerol tristearate, triglycerol monostearate, decaglycerol tetralaurate, triglycerol dimyristate, triglycerol monobehenate, diglycerol dipalmitate, diglycerol monostearate, diglycerol monolignocerate and triglycerol dicaprate. The fatty acids used in the esterification can be a mixture of fatty acid chain lengths such as, for example, the fatty acid mixtures derived from coconut oil or tallow. It is preferred that the fatty acids be saturated and contain from about 12 to about 22 carbon atoms. The fatty acid mixtures derived from natural fats and oils such as rapeseed oil, peanut oil, lard, tallow, coconut oil, soybean oil, etc., can be converted to saturated form by hydrogenation, as is well known in the art.

When naming particular polyglycerol esters it must be remembered that the name designates the average of an actual mixture of molecules. Thus, the name triglycerol distearate describes an ester wherein the average degree of polymerization of the polyglycerol is 3 and the average number of ester groups per molecule is 2.

A representative range of polyglycerol esters are commercially available under the name Drewpol® from Pacific Vegetable Oils, Boonton, N.J.

The polyglycerol esters described herein can also be applied to fabrics in the rinse operation of a normal wash cycle to obtain softening and anti-static benefits. However, the preferred mode of application is by distributing the polyglycerol esters onto fabrics in the fabric drying operation in a heated dryer as disclosed herein.

OPTIONAL SOFTENING COMPOSITION COMPONENTS

Various additives can also be used in combination with the fatty polyglycerol ester softening agent in the softening compositions herein. Although not essential to the invention herein, certain fabric treating additives are particularly desirable and useful, e.g., perfumes, brightening agents, shrinkage controllers, spotting agents, and the like.

Cationic anti-static and/or softening agents can optionally (and preferably) be added to the fatty glycerol ester-containing softener compositions to provide an additional increment of static control and fabric softening, but are not essential for this purpose. In fact, it is a surprising feature of the present invention that the compositions herein can deliver excellent softening and anti-static benefits in the dryer, without fabric staining, and yet be completely free or substantially free of cationic anti-static and/or softening agents. If cationic anti-static agents are used, however, they act synergistically in combination with fatty polyglycerol esters to provide static control in the dryer superior to that obtained with either material alone. The use of cationic softeners and fatty polyglycerol esters in dryer added fabric conditioning compositions is described in the application of Russell Norris entitled FABRIC TREATMENT COMPOSITIONS, Ser. No. 647,970, filed Jan. 9, 1976, abandoned in favor of Ser. No. 813,597, filed July 7, 1977, which has been abandoned in favor of Ser. No. 959,381, filed Nov. 9, 1978., filed concurrently herewith and incorporated by reference herein.

Examples of cationic anti-static and/or softening materials are those described in Morton, U.S. Pat. No. 3,686,025, issued Aug. 22, 1972, and Diery et at., U.S. Pat. No. 3,849,435, issued Nov. 19, 1974, both patents incorporated herein by reference. Particularly preferred materials of this type include quaternary ammonium salts such as dialkyl dimethyl ammonium chlorides, methylsulfates and ethylsulfates wherein the alkyl groups contain from about 10 to 24 carbon atoms. Examples of such preferred materials include ditallowalkyldimethylammonium methylsulfate, distearyldimethylammonium methylsulfate, dipalmityldimethylammonium methylsulfate and dibehenyldimethylammonium methylsulfate.

While not essential, liquids which serve as a carrier for the softening agents and other materials can also be employed in conjunction with the softening compositions herein. Such liquids can be used, for example, to more evenly impregnate an absorbent substrate with the softening composition when such an absorbent substrate is employed (as discussed hereinafter) as the dispensing means for the instant compositions. When a liquid carrier is so used, it should preferably be inert or stable with the fabric softeners. Moreover, the liquid carrier used in substrate impregnation should be substantially evaporated at room temperatures, and the residue (i.e., the softening agent and other optional materials) should then be sufficiently hardened so as not to run or drip off the substrate, or cause the substrate to stick together when folded. Isopropyl alcohol or isopropyl alcohol/water mixtures are the preferred liquid carriers for substrate impregnation purposes. Methanol, ethanol, acetone, ethylene glycol, propylene glycol, alcohol ethoxylate nonionic surfactants and/or liquified fluorocarbons such as dichlorodifluoroethane and dichlorodifluoromethane can also be used as carriers either for dispensing the softening compositions in the dryer, for introducing the softening compositions into the dryer dispensing means or for facilitating release of the softening compositions from the dryer dispensing means.

Other additives can include anti-creasing agents, finishing agents, fumigants, lubricants, fungicides, and sizing agents. Specific examples of useful additives disclosed herein can be found in any current Year Book of the American Association of Textile Chemists and Colorists. Any additive used should be compatible with the softening agents.

The amounts of some additives (e.g., perfume and brighteners) that are generally used in combination with the softening agents are small, being in the range of from 0.01% to 10% by weight of the softening composition. Other additives such as the optional cationic anti-static/softening agents can be present in larger amounts. Such cationic fabric softening materials can be present in fabric softening compositions to the extent of from about 0.01% to 30% or more by weight of the softening composition.

A highly preferred softening composition herein contains from about 70% to 95% by weight of the composition of the essential fatty polyglycerol ester component and from about 5% to 30% by weight of the composition of an optional cationic anti-static/softening agent.

When the compositions of the invention are dispensed from a spray device (e.g., aerosol can, mechanical pump spray, etc.), the composition will generally be present with a relatively high level of a carrier in said devices, the carriers being such materials as solvents and/or propellants, which do not, in themselves, condition fabrics. In such devices, the compositions of the present invention are used at levels of from about 5% to 25% composition and about 95% to 75% carrier. Examples of solvent carrier are ethanol and isopropanol. Examples of propellants are the Freons (e.g., Freon 12 and Freon 114). For purposes of describing the invention herein, the carrier materials will be considered part of the dispensing means.

DISPENSING MEANS

The fatty polyglycerol ester-containing softening compositions can be employed by simply adding a measured amount into the dryer, e.g., as liquid dispersion. However, in a preferred embodiment, the fatty polyglycerol ester softeners are provided as an article of manufacture in combination with a dispensing means which effectively releases the ester-containing composition in an automatic clothes dryer. Such dispensing means can be designed for single usage or for multiple uses.

One such article comprises a sponge material releasably enclosing enough softener composition to effectively impart fabric softness during several cycles of clothes drying. This multi-use article can be made by filling a hollow sponge with about 20 grams of the fatty polyglycerol ester. In use, the ester melts and leaches out through the pores of the sponge to soften fabrics. Such a filled sponge can be used to treat several loads of fabrics in conventional dryers, and has the advantage that it can remain in the dryer after use and is not likely to be misplaced or lost.

Another article comprises a cloth or paper bag releasably enclosing the fatty polyglycerol ester-containing softening composition and sealed with the hardened ester. The action and heat of the dryer opens the bag and releases the ester to perform its softening function.

Still another article comprises an aerosol cannister containing the above described softening compositions under pressure. The compositions can be dispensed from this aerosol article onto the interior surface of the cold dryer drum, prior to addition of fabrics, in the manner more fully described in Rudy et al, U.S. Pat. No. 3,650,816, issued Mar. 21, 1972, incorporated herein by reference.

Other devices and articles suitable for dispensing the softening material into automatic dryers include those described in Dillarstone, U.S. Pat. No. 3,736,668, issued June 5, 1973; Compa et al, U.S. Pat. No. 3,701,202, issued Oct. 31, 1972; Furgal, U.S. Pat. No. 3,634,947, issued Jan. 18, 1972; Hoeflin, U.S. Pat. No. 3,633,538, issued Jan. 11, 1972 and Rumsey, U.S. Pat. No. 3,435,537, issued Apr. 1, 1969. All of these patents are incorporated herein by reference.

A highly preferred single-use article herein comprises the fatty polyglycerol ester-containing composition releasably affixed to a flexible substrate such as, for example, a sheet of paper, a sheet of woven or non-woven cloth substrate or a sheet of foamed plastic such as polyurethane. When such an article is placed in an automatic laundry dryer, the heat and tumbling action of the dryer removes the composition from the substrate and deposits it on the fabrics.

The sheet conformation has several advantages. For example, effective amounts of the fatty polyglycerol esters for use in conventional dryers can be easily sorbed onto and into the sheet substrate by a simple dipping or padding process. Thus, the user need not measure the amount of ester necessary to obtain fabric softness. Additionally, the flat configuration of the sheet provides a large surface area which results in efficient release of the softener materials onto fabrics by the tumbling action of the dryer.

The water-insoluble paper, or woven or non-woven substrates used in the articles herein can have a dense, or more preferably, open or porous structure. Examples of suitable materials which can be used as substrates herein include paper, woven cloth, and non-woven cloth. The term "cloth" herein means a woven or non-woven substrate for the articles of manufacture, as distinguished from the term "fabric" which encompasses the clothing fabrics being dried in an automatic dryer.

Highly preferred paper, woven or non-woven "absorbent" substrates useful herein are fully disclosed in Morton, U.S. Pat. No. 3,686,025, issued Aug. 22, 1972, incorporated herein by reference. It is known that most substances are able to absorb a liquid substance to some degree; however, the term "absorbent" as used herein, is intended to mean a substance with an absorbent capacity (i.e., a parameter representing a substrate's ability to take up and retain a liquid) from 2 to 25, preferably 5 to 7, times its weight of water.

Determination of absorbent capacity values is made by using the capacity testing procedures described in U.S. Federal Specifications UU-T-595b, modified as follows:

(1) tap water is used instead of distilled water;
(2) the specimen is immersed for 30 seconds instead of 3 minutes;
(3) draining time is 15 seconds instead of 1 minute; and
(4) the specimen is immediately weighed on a torsion balance having a pan with turned-up edges. Absorbent capacity values are then calculated in accordance with the formula given in said Specification. Based on this test, one-ply, dense bleached paper (e.g., kraft or bond having a basis weight of about 32 pounds per 3,000 square feet) has an absorbent capacity of 3.5 to 4; commercially available household one-ply toweling paper has a value of 5 to 6; and commercially available two-ply household toweling paper has a value of 7 to about 9.5.

Using a substrate with an absorbent capacity of less than 2 tends to cause too rapid release of the softening agent from the substrate resulting in several disadvantages, one of which is uneven softening of the fabrics. Using a substrate with an absorbent capacity over 25 is undesirable, inasmuch as too little of the softening agent is released to soften the fabrics in optimal fashion during a normal drying cycle. If the substrate is a woven or non-woven cellulosic cloth or paper, rather than a foamed plastic material, the absorbency should preferably be in the range of 4 to 12, most preferably between 5 and 7. For foamed plastic materials, the absorbency is preferably in the range of from about 15 to 22.

The use of dense, one-ply or ordinary kraft or bond paper for the softening article substrate can result in increased staining of certain types of treated fabrics. This staining is caused by the low absorbent capacity of the paper substrate.

As noted above, suitable materials which can be used as a substrate in the invention herein include, among others, sponges (e.g., foamed plastics), paper, and woven and non-woven cloth, all having the necessary absorbency requirements defined above. The preferred substrates of the softening compositions herein are cellulosic, particularly multi-ply paper and non-woven cloth.

More specifically, a preferred paper substrate comprises a compressible, laminated, calendered, multi-ply, absorbent paper structure. Preferably, the paper structure has 2 or 3 plies and a total basis weight of from 14 to 90 pounds per 3,000 square feet and absorbent capacity values within the range of 7 to 10. Each ply of the preferred paper structure has a basis weight of about 7 to 30 pounds per 3,000 square feet, and the paper structure can consist of plies having the same or different basis weights. Each ply is preferably made from a creped, or otherwise extensible, paper with a creped percentage of about 15% to 40% and a machine direction (MD) tensile and cross-machine (CD) tensile of from about 100 to 1,500 grams per square inch of paper width. The two outer plies of a 3-ply paper structure or each ply of a 2-ply paper structure are embossed with identical repeating patterns consisting of about 16 to 200 discrete protuberances per square inch, raised to a height of from about 0.010 inch to 0.40 inch above the surface of the unembossed paper sheet. From about 10% to 60% of the paper sheet surface is raised. The distal ends (i.e., the ends away from the unembossed paper sheet surface) of the protuberances on each ply are mated and adhesively joined together, thereby providing a preferred paper structure exhibiting a compressive modulus of from about 200 to 800 inch-grams per cubic inch and Handle-O-Meter (HOM) MD and CD values of from about 10 to 130.

Suitable adhesives for multi-ply paper are known in the art and include water, starches, wet-strength resins, and polyvinyl acetates. A particularly suitable adhesive is prepared by heating from about 2 to about 4 parts by weight of substantially completely hydrolyzed polyvinyl alcohol resin in from about 96 to about 98 parts by weight of water. Preferably, about 0.03 pound of adhesive solids are used to join 3,000 square feet of the embossed plies, with the adhesive being applied to the distal surfaces of the protuberances of one or all plies.

The compressive modulus values which define the compressive deformation characteristics of a paper structure compressively loaded on its opposing surfaces, the HOM values which refer to the stiffness or handle of a paper structure, the MD and CD HOM values which refer to HOM values obtained from paper structure samples tested in a machine and cross-machine direction, the methods of determining these values, the equipment used, and a more detailed disclosure of the paper structure preferred herein, as well as methods of its preparation, can be found in Wells; U.S. Pat. No. 3,414,459, issued Dec. 3, 1968, the disclosure of which is incorporated herein by reference.

The preferred non-woven cloth substrates used in the invention herein can generally be defined as adhesively bonded fibrous or filamentous products having a web or carded fiber structure (where the fiber strength is suitable to allow carding), or comprising fibrous mats in which the fibers or filaments are distributed haphazardly or in random array (i.e., an array of fibers in a carded web wherein partial orientation of the fibers is frequently present, as well as a completely haphazard distributional orientation), or substantially aligned. The fibers or filaments can be natural (e.g., wool, silk, jute, hemp, cotton, linen, sisal, or ramie) or synthetic (e.g., rayon, cellulose ester, polyvinyl derivatives, poly-olefins, polyamides, or polyesters).

Methods of making non-woven cloths are not a part of this invention and, being well known in the art, are not described in detail herein. Generally, however, such cloths are made by air- or water-laying processes in which the fibers or filaments are first cut to desired lengths from long strands, passed into a water or air stream, and then deposited onto a screen through which the fiber-laden air or water is passed. The deposited fibers or filaments are then adhesively bonded together, dried, cured, and otherwise treated as desired to form the non-woven cloth. Non-woven cloths made of polyesters, polyamides, vinyl resins, and other thermoplastic fibers can be spun-bonded, i.e., the fibers are spun out onto a flat surface and bonded (melted) together by heat or by chemical reactions.

The absorbent properties preferred herein are particularly easy to obtain with non-woven cloths and are provided merely by building up the thickness of the cloth, i.e., by superimposing a plurality of carded webs or mats to a thickness adequate to obtain the necessary absorbent properties, or by allowing a sufficient thickness of the fibers to deposit on the screen. Any diameter or denier of the fiber (generally up to about 10 denier) can be used, inasmuch as it is the free space between each fiber that makes the thickness of the cloth directly related to the absorbent capacity of the cloth, and which, further, makes the non-woven cloth especially suitable for impregnation with a softening composition by means of intersectional or capillary action. Thus, any thickness necessary to obtain the required absorbent capacity can be used.

The choice of binder-resins used in the manufacture of non-woven cloths can provide substrates possessing a variety of desirable traits. For example, the absorbent capacity of the cloth can be increased, decreased, or regulated by respectively using a hydrophilic binder-resin, a hydrophobic binder-resin, or a mixture thereof, in the fiber bonding step. Moreover, the hydrophobic binder-resin, when used singly or as the predominant compound of a hydrophobic-hydrophilic mixture, provides nonwoven cloths which are especially useful as substrates when the softening articles herein are used with damp fabrics in an automatic dryer.

The preferred fabric softening articles of the present invention are structured to be compatible with conventional laundry dryer designs. While it is preferred to employ the articles of the present invention in an automatic laundry dryer, other equivalent machines can be employed, and in some instances, heat and drying air may be omitted for part or all of the cycle. Generally, however, heated air will be employed and such air will be circulated frequently in the dryer. Normally, there are from about 5 to 50 volume changes of drying air in the dryer drum per minute and the air moves at about 125 to 175 cubic feet per minute. These changing volumes of air create a drawing or suction effect which can, especially with small fabric loads, cause an item such as a sock, handkerchief or the like, or a fabric conditioning article, to be disposed on the surface of the air outlet of the dryer. A usual load of fabrics of from about 4 to 12 pounds dry weight will fill from about 10% to 70% of the volume of most dryers and will normally pose little difficulty. A sufficient number of tumbling items will normally be present to prevent any item from being drawn to the exhaust outlet or to cause it to be removed from the outlet. In the event, however, a fabric softening article is caused to be disposed in relation to the air exhaust outlet in such a manner as to cause blockage of passing air, undesirable temperature increases can result. In the case of fabric softening articles prepared from the normally solid or waxy softeners such as the polyglycerol esters which soften or melt under conditions of heat, the article may tend to adhere to an exhaust outlet.

The problem of blockage can be solved by providing openings in the article in the manner described in two U.S patents of A. R. McQueary, Nos. 3,944,694, issued Mar. 16, 1976, and 3,956,556, issued May 11, 1976, both incorporated herein by reference. More specifically, slits or holes are cut through the substrate or formed in situ in the substrate to allow free passage of air.

The slit or hole openings are provided in the preferred fabric softening articles of the invention for two principal purposes. Importantly, the openings permit passage of air in the event the article is placed in a blocking relationship to the air exhaust outlet. Moreover, the openings provide a degree of flexibility or resiliency which causes the article to crumple or pucker. The effect of such crumpling is that only a portion of the air exhaust outlet will be covered by the softening article in the event it is carried by the moving air stream to the exhaust outlet. Moreover, the crumpled article is more readily removed by tumbling fabrics than would be the case if the article were placed in a flat relationship to the exhaust outlet.

ARTICLE MANUFACTURE

The articles herein comprise the fatty polyglycerol ester-containing softener compositions in combination with any dispensing means suitable for releasing softening agent at temperatures encountered in automatic laundry dryers. Preferred articles herein are those wherein the softening composition is impregnated into or coated onto an absorbent substrate. The impregnation or coating can be accomplished in any convenient manner, and many methods are known in the art. For example, the softening composition, in liquid form, can be sprayed onto a substrate or can be added to a woodpulp slurry from which the substrate is manufactured.

Impregnating, rather than coating, the substrate with the softener composition is highly preferred for optimal softening with minimal fabric staining. The term "coating" connotes the adjoining of one substance to the external surface of another; "impregnating" is intended to mean the permeation of the entire substrate structure, internally as well as externally. One factor affecting a given substrate's absorbent capacity is its free space. Accordingly, when a softening composition is applied to an absorbent substrate, it penetrates into the free space; hence, the substrate is deemed impregnated. The free space in a substrate of low absorbency, such as a one-ply kraft or bond paper, is very limited; such a substrate, is therefore, termed "dense". Thus, while a small portion of the softening composition penetrates into the limited free space available in a dense substrate, a rather substantial balance of the softener composition does not penetrate and remains on the surface of the substrate so that it is deemed a coating. The difference between coating and impregnation is believed to explain why the softener-impregnated sheet substrates of the invention herein eliminate or substantially reduce the staining of fabrics observed when a softener-coated dense substrate is utilized.

In one method of making the preferred softener-impregnated absorbent sheet substrate, a softener composition containing fatty polyglycerol ester alone or with the optional additives is applied to absorbent paper or non-woven cloth by a method generally known as padding. Another preferred method involves forcing the softener into the sheet substrate while the sheet is under tension. This method is described in Application Ser. No. 530,312, Kissner, filed Dec. 5, 1974, incorporated by reference herein. The softening composition is preferably applied in liquid form to the substrate. Thus, the fatty polyglycerol ester-containing softener compositions which are normally solid or semi-solid at room temperature should first be melted and/or solvent treated with one of the liquid carriers mentioned hereinbefore. Methods of melting the softener composition and/or for treating the softener composition with a solvent are known and can easily be done to provide a satisfactory softener-treated substrate.

In another preferred method, the fatty polyglycerol ester-containing softener composition in liquified form is placed in a pan or trough which can be heated to maintain the softener composition in liquid form. The liquid softener composition contains any of the desired optional additives. A roll of absorbent paper (or cloth) is then set up on an apparatus so that it can unroll freely. As the paper or cloth unrolls, it travels downwardly and, submersed, passes through the pan or trough containing the liquid softener at a slow enough speed to allow sufficient impregnation. The absorbent paper or cloth then travels upwardly and through a pair of rollers which remove excess bath liquid and provide the absorbent paper or cloth with about 1 to about 12 grams of the fatty polyglycerol ester softening agent per 100 $in.^2$ to 150 $in.^2$ of substrate sheet. The impregnated paper or cloth is then cooled to room temperature, after which it can be folded, cut or perforated at uniform lengths, and subsequently packaged and/or used.

The rollers used resemble "squeeze rolls" used by those in the paper and paper-making art; they can be made of hard rubber or steel. Preferably, the rollers are adjustable, so that the opening between their respective surfaces can be regulated to control the amount of the softener composition liquid on the paper or cloth.

In another method of impregnation, the softener composition, in liquid form, is sprayed onto absorbent paper or cloth as it unrolls and the excess softener is then squeezed off by the use of squeeze rollers or by a doctor-knife. Other variations include the use of metal "nip" rollers on the leading or entering surfaces of the sheets onto which the softening composition is sprayed; this variation allows the absorbent paper or cloth to be treated, usually on one side only, just prior to passing between the rollers whereby excess softener is squeezed off. This variation can optionally involve the use of metal rollers which can be heated to maintain the softener composition in the liquid phase. A further method involves separately treating a desired number of the individual plies of a multi-ply paper and subsequently adhesively joining the plies with a known adhesive-joinder compound; this provides an article which can be untreated on one of its outer sides, yet contains several other plies, each of which is treated on both sides.

In applying the softener composition to the absorbent substrate, the amount of softener composition (containing up to 100% by weight of fatty polyglycerol ester) impregnated into or coated onto the absorbent substrate is conveniently in the weight ratio range of from about 10:1 to 0.5:1 based on the ratio of total softener composition to dry, untreated substrate (fiber plus binder). Preferably, the amount of the softener composition ranges from about 5:1 to about 1:1, most preferably from about 3:1 to 1:1, by weight of the dry, untreated substrate.

Following application of the liquified softener composition, the articles are held at room temperature until the softener composition solidifies. The resulting dry articles, prepared at the softener composition:substrate ratios set forth above, remain flexible; the sheet articles are suitable for packaging in rolls or they can be cut and packaged as stacks of a size suitable for one usage each. The sheet articles can optionally be slitted or punched to provide a non-blocking aspect at any convenient time during the manufacturing process.

The most highly preferred articles herein are those where the fatty polyglycerol ester-containing softener composition is releasably affixed to a woven or non-woven cloth or sheet substrate of the type disclosed hereinabove having an absorbent capacity of from about 4 to about 12. A highly preferred woven or non-woven cloth or sheet substrate for such an article has an absorbent capacity of from about 5 to 7. The most highly preferred substrate for the articles comprises a water-laid or air-laid non-woven cloth consisting essentially of cellulosic fibers, said fibers having a length of about 3/16 inch to about 2 inches and a denier from about 1.5 to about 5, said fibers being at least partially oriented haphazardly, and adhesively bonded together with a binder-resin. Such water-laid or air-laid non-woven cloths can easily be prepared having the preferred absorbent capacities set forth above.

It is most convenient to provide an article in the form of a non-blocking flexible sheet substrate having the physical parameters noted hereinabove, said substrate having an area of from about 50 $in.^2$ to about 200 $in.^2$, containing from about 1.5 grams to about 7.5 of the fatty polyglycerol ester releasably impregnated in said substrate. Such articles can be provided with, as additional components, other fabric treating additives of the type disclosed hereinabove. The articles are provided with openings such as the holes or slits described hereinabove, said openings comprising from about 0.5% to about 75%, preferably 5% to about 40%, of the area of the article, said openings being so disposed as to provide a non-blocking effect.

It should be noted that the preferred absorbent substrate articles described above are surprisingly easy to manufacture on a commercial scale. Production of these substrates with the particular fatty polyglycerol ester-containing softening compositions of the instant invention generally results in a significantly lower level of softener composition dusting and build-up on machinery in comparison to dusting and build-up resulting from the manufacture of similar prior art products utilizing quaternary materials alone.

USAGE

In the method aspect of this invention the fatty polyglycerol ester softeners are used in an effective amount to soften and condition fabrics in an automatic laundry dryer. The effective, i.e., softening and static-controlling, amount of the fatty polyglycerol esters used in the manner of this invention will depend somewhat on the type of fabric being treated and the dampness of the surrounding atmosphere. For example, it is well known that under conditions of low humidity, static control in fabrics is somewhat more difficult to achieve than under conditions of high humidity.

For most purposes, fatty polyglycerol esters are applied to fabrics at a rate of about 0.01 grams to about 12 grams, preferably 1 g. to about 3 g., per 5 lbs. of fabrics on a dry fabric weight basis. Higher usage rates can be employed, if desired, but can result in an undesirable greasy feel on the fabrics.

The method herein is carried out in the following manner. Damp fabrics, usually containing from about 1 to about 1.5 times their weight of water, are placed in the drum of an automatic clothes dryer. In practice, such damp fabrics are commonly obtained by laundering, rinsing and spin-drying the fabrics in a standard washing machine. The fatty polyglycerol esters, either alone or in combination with other additives, are simply spread uniformly over all fabric surfaces in any suitable manner, for example, by sprinkling a fatty polyglycerol ester-containing composition onto the fabrics from a shaker device or contacting the fabrics with a flexible substrate which dispenses the composition onto the fabrics. Alternatively, the fatty polyglycerol ester-containing compositions can be sprayed or otherwise coated on the dryer drum, itself. The dryer is then operated in standard fashion to dry the fabrics at a temperature at least equal to or higher than the melting point of the softener composition, i.e., from about 38° C. to about 100° C., preferably about 50° C. to about 80° C., for a period from about 10 minutes to about 60 minutes, depending on the fabric load and type. On removal from the dryer, the dried fabrics are softened. Moreover, the fabrics instantaneously sorb a minute quantity of water which increases the electrical conductivity of the fabric surfaces, thereby quickly and effectively dissipating static charge.

In the preferred mode, the present process is carried out by fashioning an article comprising the flexible substrate dispensing means of the type hereinabove described in releasable combination with a fatty polyglycerol ester-containing softener composition. This article is simply added to a clothes dryer together with the damp fabrics to be treated. The heat and tumbling action of the revolving dryer drum evenly distributes the softener composition over all fabric surfaces, and dries the fabrics.

The following are non-limiting examples of the instant articles and methods.

EXAMPLE I

A dryer-added fabric softening article is prepared by sprinkling 2.5 grams of triglycerol monostearate (melting point 55° C.–70° C.) uniformly over the surface of an air-laid non-woven cloth comprising 70% regenerated cellulose (American Viscose Corporation) and 30% hydrophobic binder-resin (Rhoplex HA-8 on one side of the cloth, and Rhoplex HA-16 on the other side, Rohm & Haas Co.). The cloth has a thickness of 4 to 5 mils, a basis weight of about 24 grams per square yard and an absorbent capacity of 6. A one foot length of the cloth, 8⅓ inches wide, weighs about 1.78 grams. The fibers in the cloth are ca. ¼ inch in length, 3.0 denier, and are oriented substantially haphazardly. The fibers in the cloth are lubricated with sodium oleate. The substrate cloth is 10 inches × 11 inches. The triglycerol monostearate covered cloth is transferred to a heated plate, whereupon the ester melts and impregnates the interfiber free space in the cloth substrate. The article is removed from the hot plate and allowed to cool to room temperature, whereby the ester solidifies. The cloth retains its flexibility.

Following solidification of the polyglycerol ester, the cloth is slitted with a knife. (Conveniently, the cloth is provided with 5 to 9 rectilinear slits extending along one dimension of the substrate, said slits being in a substantially parallel relationship and extending to within about one inch from at least one edge of said dimension of the substrate.) The width of an individual slit is ca. 0.2 inches.

An article prepared in the foregoing manner is placed in an automatic clothes dryer together with 5 lbs. of freshly washed, damp (ca. 5.5 lbs. water) mixed cotton, polyester, and polyester/cotton blend clothes. The automatic dryer is operated at an average temperature of 70° C. for a period of 45 minutes. During the course of the drying operation the clothes and softener article are constantly tumbled together by the rotation of the dryer drum. After the drying cycle, the clothes are removed from the dryer into a room having a relative humidity of 50%. The clothes are found to exhibit excellent softness and anti-static properties. Moreover, repeated usage in the dryer of articles of the above type causes substantially no paint softening or metal corrosion of the interior dryer surfaces.

Similar results are secured when, in the foregoing article, the triglycerol monostearate is replaced by an equivalent amount of hexaglycerol tristearate, triglycerol dimyristate, triglycerol monobehenate, diglycerol dipalmitate, diglycerol distearate, diglycerol monolignocerate and triglycerol dicaprate and the diester of diglycerol and hydrogenated (Iodine Value 8) tallow fatty acids.

EXAMPLE II

A dryer-added fabric softening article is prepared in the following manner. A softener composition of 70% diglycerol monostearate and 30% ditallowdimethylammonium methylsulfate is mixed and placed in a trough and heated until melted.

A 10 inch wide roll of paper substrate is utilized, said substrate being a compressible, laminated and calendered absorbent paper structure comprising two extensible paper sheets, each sheet (or ply) having a basis weight of about 16 lbs. per 3,000 square feet and a MD value of about 660, a CD value of about 380 and 20% dry-crepe. Each sheet of the paper substrate is embossed with identical raised patterns consisting of about 70 inwardly directed discrete protuberences per square inch, raised about 0.02 inches above the surface of the paper sheets. The protuberences constitute about 45% of the surface of each sheet and are mated and adhesively joined with polyvinyl alcohol resin. The paper structure exhibits a compressive modulus of about 340 together with HOM MD/CD values of about 36/31 and has an absorbent capacity of about 7. (This paper is a particularly preferred paper substrate herein and weighs about 3.7 grams per 10 inch × 12 inch sheet).

The paper sheet substrate is mounted on a roll and is unrolled in the trough. The paper travels at a rate of 5–6 feet per minute and is then directed upwardly and through the pair of hard, rubber rollers mounted so that their surfaces just touch. The turning rollers squeeze off excess softener liquid and impregnate the paper with the softener at a softener:paper impregnation ratio of about 2.7:1 by weight of the dry, untreated paper. After passing through the rollers, the liquified softener (now impregnated into the paper) is cooled and hardened. The resulting paper article is substantially solid, yet flexible, is stable to decomposition, not "runny" or dripping, and which, although waxy to the touch, does not stick together when folded.

A 10 in. × 12 in. paper-impregnated article prepared in the foregoing manner is punched with 9 evenly-spaced 0.5 in. diameter holes. The resulting article has about 8 grams of the softening composition absorbed thereon. The article is placed in an automatic clothes dryer together with five lbs. of mixed clothes which are dampened with an equal amount of water. The dryer is operated at an average temperature of 75° C. for a period of 40 minutes, with tumbling. At the end of the drying cycle, the clothing is removed from the dryer and is found to be provided with an excellent soft and anti-static finish, with no noticeable staining of the fabrics. The dryer operates without any vent blockage.

EXAMPLE III

An article which can be used to provide through-the-dryer fabric softening is prepared in aerosol form. 25 Grams of triglycerol monopalmitate are admixed with 50 ml. of trichloroethylene until a homogeneous mixture is secured. The mixture is placed in an aerosol container, to which is added (under pressure) 15 ml. of a 1:1 (weight) mixture of liquified dichlorodifluoroethane and dichlorodifluoromethane propellant gases. Following the pressure fill, the aerosol can is provided with a standard actuator valve and dip tube extending to the bottom of the can.

A standard laundry dryer drum, at ambient temperature, is sprayed uniformly with 10 grams of the foregoing aerosol composition. Five lbs. of damp clothing containing about 5 lbs. of water are added to the dryer drum, and the dryer is operated in standard fashion at a temperature averaging around 70° C. for a period of 35 minutes. After the drying cycle is over, the clothes are allowed to come to ambient temperature and are removed from the dryer. The clothes are found to be provided with a soft, anti-static finish.

What is claimed is:

1. An article adapted for providing fabric softening within an automatic clothes dryer, said article comprising:

(a) a fabric softening amount of softening composition comprising a fatty alkyl polyglycerol ester softener component having the formula $$R_1\overset{\overset{O}{\|}}{C}-O-(CH_2-\overset{\overset{OR_2}{|}}{CH}-CH_2O)_nR_3$$

wherein $R_1$ is a $C_9$ to $C_{23}$ aliphatic acylic hydrocarbyl group, and $R_2$ and $R_3$ are selected from the group consisting of hydrogen and $C_8$ to $C_{24}$ fatty acyl groups and n is from about 2 to about 4, wherein the crystal melting point of said fatty polyglycerol ester is above about 38° C., and wherein the degree of esterification of said polyglycerol ester is from about 0.2 to about 0.6; and (b) a dispensing means which provides for release of said softening composition within an automatic laundry dryer at dryer operating temperatures, wherein when said dispensing means is a flexible substrate in a sheet configuration the softening composition is impregnated or coated onto the substrate to provide a weight ratio of softening composition to dry substrate ranging from about 10:1 to 0.5:1.

2. An article according to claim 1 wherein the dispensing means is an aerosol device.

3. An article according to claim 1 wherein in the fatty polyglycerol ester component $R_1$ is a $C_{11}$ to $C_{21}$ saturated acyclic hydrocarbyl group and $R_2$ and $R_3$ can be the same or different from each other and are selected from the group consisting of hydrogen and $C_{12}$ to $C_{22}$ saturated fatty acyl groups, and wherein said polyglycerol ester comprises at least 70% by weight of said softening composition.

4. An article acording to claim 3 wherein the dispensing means is an aerosol device.

5. An article according to claim 3 wherein the substrate is a foamed plastic sheet having an absorbent capacity of from about 15 to about 22.

6. An article according to claim 3 wherein the dispensing means comprises a flexible substrate in a sheet configuration having an absorbent capacity of from about 2 to about 25 and wherein the softening composition is impregnated in the substrate to provide a weight ratio of softening composition to dry substrate ranging from about 10:1 to 0.5:1.

7. An article according to claim 6 wherein the substrate is a woven or non-woven cellulosic cloth or paper and has an absorbent capacity of from about 4 to about 12.

8. An article according to claim 7 wherein the substrate comprises a non-woven cloth having an absorbent capacity of from about 5 to 7 and wherein the weight ratio of softening composition to substrate on a dry weight basis ranges from about 5:1 to 1:1.

9. A method of imparting a softening and anti-static effect to fabrics in an automatic laundry dryer, comprising the steps of (a) placing damp fabrics into the dryer;

(b) applying to said fabrics a fabric softening composition comprising a fatty polyglycerol ester of the formula

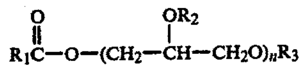

wherein $R_1$ is a $C_9$ to $C_{23}$ aliphatic acylic hydrocarbyl group, and $R_2$ and $R_3$ are selected from the groups consisting of hydrogen and $C_8$ to $C_{24}$ fatty acyl groups and n is from about 2 to about 4, wherein the cyrstal melting point of said fatty polyglycerol ester is above about 38° C., and wherein the degree of esterification of said polyglycerol ester is from about 0.2 to about 0.6, said application being at the rate of from .01 gram to about 12 grams of polyglycerol ester per 5 pounds of fabrics on a dry fabric weight basis; and (c) operating the dryer to dry the fabrics at a temperature of at least equal to or higher than the melting point of the composition for a period of from about 10 minutes to 60 minutes.

10. The method of claim 9 wherein the rate of application of said polyglycerol ester is from about 1 gram to about 5 grams per 5 pounds of fabrics on a dry fabric weight basis.

11. The method of claim 10 wherein $R_1$ is a $C_{11}$ to $C_{21}$ saturated acyclic hydrocarbyl group and $R_2$ and $R_3$ can be the same or different from each other and are selected from the group consisting of hydrogen and $C_{12}$ to $C_{22}$ saturated fatty acyl groups.

12. The method of claim 11 wherein the composition is dispensed within the dryer from a flexible substrate sheet having the softener composition releasably affixed thereto.

13. The method of claim 11 wherein the composition is dispensed onto the interior surface of the cold dryer drum from an aerosol dispenser prior to addition of fabrics.

* * * * *